(12) United States Patent
Nomoto

(10) Patent No.: US 6,937,547 B2
(45) Date of Patent: Aug. 30, 2005

(54) SYSTEM AND METHOD FOR DETECTING TRACKING ERROR

(75) Inventor: Takayuki Nomoto, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 315 days.

(21) Appl. No.: 10/408,279

(22) Filed: Apr. 8, 2003

(65) Prior Publication Data

US 2003/0202438 A1 Oct. 30, 2003

(30) Foreign Application Priority Data

Apr. 30, 2002 (JP) .................................... P2002-127877

(51) Int. Cl.[7] ............................................... G11B 7/00
(52) U.S. Cl. .............................. 369/44.41; 369/124.01; 369/44.34
(58) Field of Search ......................... 369/124.01, 44.41, 369/124.1, 124.13, 44.27, 44.28, 44.34

(56) References Cited

U.S. PATENT DOCUMENTS 5,258,968 A  11/1993 Matsuda et al. ......... 369/44.35
6,236,628 B1 *  5/2001 Kim ........................ 369/44.41

* cited by examiner

Primary Examiner—Nabil Hindi
(74) Attorney, Agent, or Firm—Morgan Lewis & Bockius LLP

(57) ABSTRACT

A system for detecting a tracking error comprises a two-divided type light detector (2), LPFs (4a, 4b), first and second waveform generator (5a, 5b), first and second delay circuits (6a, 6b), first and second adders (7a, 7b) and a phase comparator (8). The detector (2) has two photo detecting elements (2a, 2b) disposed separately in the radius direction of an optical disc. The LPFs (4a, 4b) remove high frequency components from the outputs of the elements (2a, 2b). The first waveform generator (5a) generates a sine wave (B1) with amplitude corresponding to the output level of a signal (A1), which passed the LPF (4a). The second waveform generator (5b) generates a sine wave (B2) having the identical frequency to the wave (B1), with amplitude corresponding to the output level of a signal (A2), which passed the LPF (4b). The first delay circuit (6a) delays the wave (B1) by the prescribed amount of delay to form a sine wave (C1). The second delay circuit (6b) delays the wave (B2) by the same amount of delay as the wave (B1) to form a sine wave (C2). The first adder (7a) adds a signal of the wave (B1) to a signal of the wave (C1) to output the first added signal (D1). The second adder (7b) adds the signal of the wave (B1) to a signal of the wave (C2) to output the second added signal (D2). The phase comparator (8) compares the first added signal (D1) with the second added signal (D2).

10 Claims, 7 Drawing Sheets

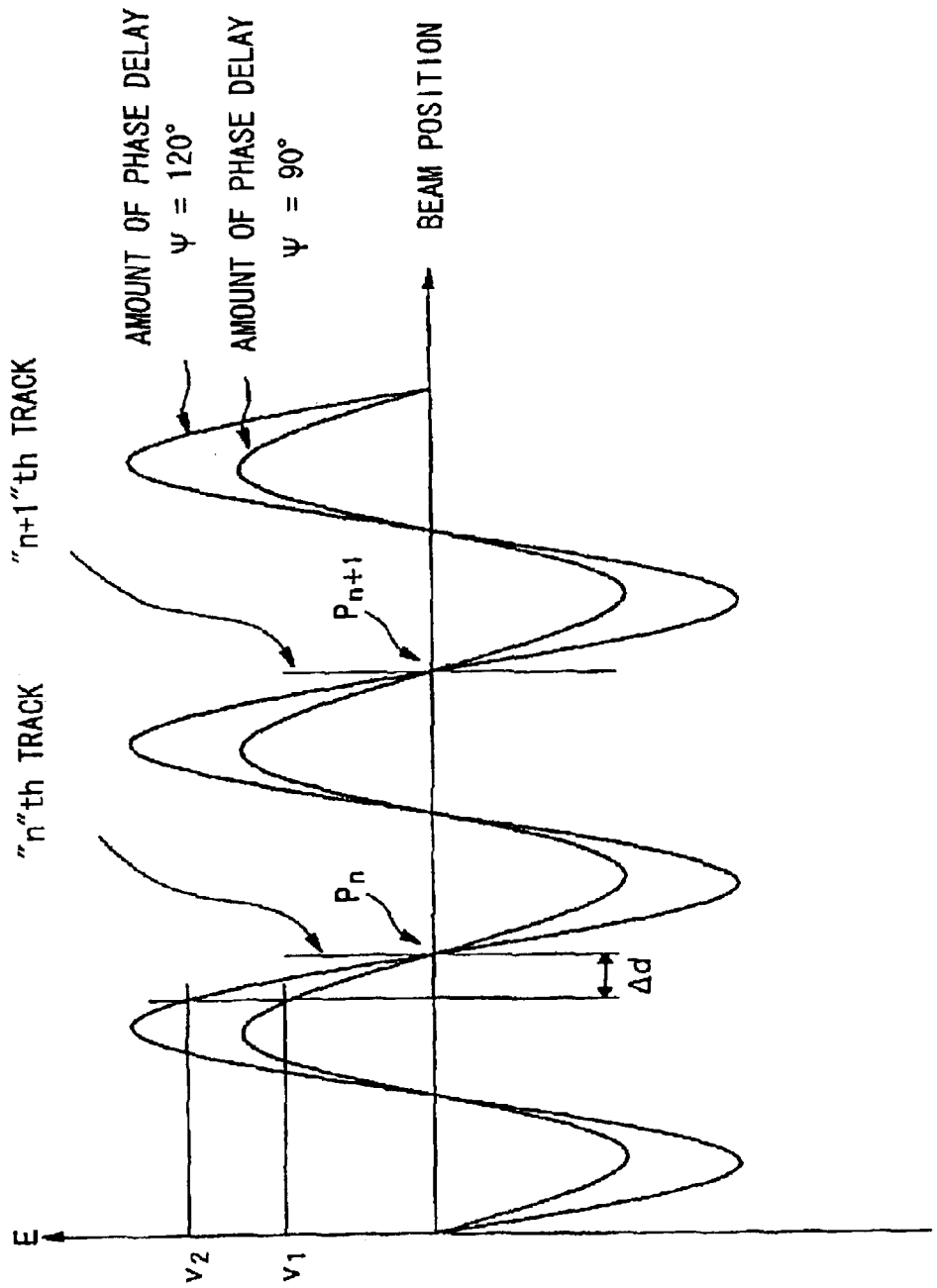

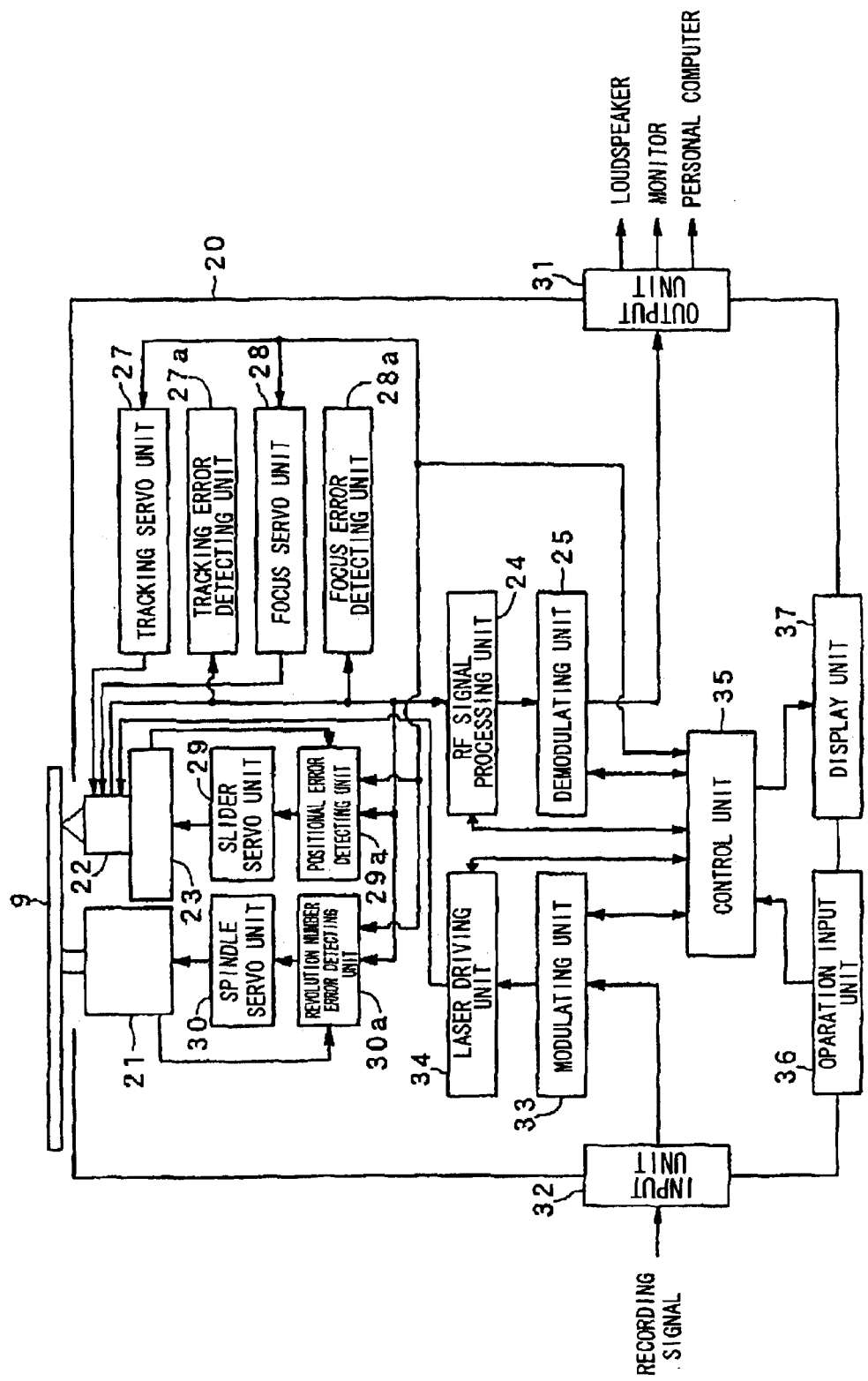

SYSTEM AND METHOD FOR DETECTING TRACKING ERROR

BACKGROUND OF THE INVENTION

1. Field of the Invention

The present invention relates generally to the field of a tracking control during the recording or reproducing of an optical disc, and more particularly to a system and method for detecting a tracking error signal to perform the tracking control.

2. Description of the Related Art

Recently, a rapid progress of informational society has caused an enormous amount of information to be processed. There has been a demand for the record media, which have so large storage capacity as to record and reproduce a large amount of information, have a small size and an excellent portability, as well as a rapid access time, to cope with such circumstances. The record media, which cope with the above-mentioned demand at this stage, include a magnetic tape, a magnetic disc, an optical disc, a magneto-optical disc, a semiconductor memory and the like. The magnetic tape excels in storage capacity, but has a low accessibility, thus being unsuitable for the use as currently demanded in which the rapid information processing is required. The semiconductor memory excels in rapid response, but is expensive, thus making it unsuitable to use such a memory in large quantities, for example in case where such semiconductor memories are used as an element having several tens of gigabyte.

On the contrary, the optical disc, which has a high accessibility, an excellent portability and a low price per bit is worthy of special remark. In addition, there has been pursued the development of technical matters to improve further the storage capacity and the recording density. There has also been conducted various research and development of devices to be used, recording formats, material for forming recording medium and a structure of the recording medium.

Providing the optical disc with the higher recording density and decreasing the optical wavelength to be used cause a demand for further improvement in structure of an optical pickup for recording information on the optical disc and reproducing the information, as well as in method for controlling the optical pickup. In such circumstances, there arise a need to consider also a method for making a positional control of a beam spot for recording information on the optical disc and reproducing the information.

Such a positional control of the beam spot requires two elements, i.e., a focus servo for collecting light on a recording surface of the optical disc and a tracking servo for causing a light beam to follow a circumferential recording track or recording pit. With respect to error detecting systems for controlling these two elements, an astigmatism system has usually been applied for the focus servo, and a phase difference system and a push-pull system for the tracking servo.

The tracking error detection through the phase difference system, which utilizes reproduction signals of pits as recorded in correspondence with information, making it impossible to obtain any tracking error signal on a disc with a groove, which has not as yet been subjected to a recording step. The push-pull system, in which the signal level depends upon an amount of reflected light from the optical disc, cannot provide a sufficient error signal in an optical disc such as a multi-layer disc having a small amount of reflected light. In view of such circumstances, it has been necessary to provide not only the error detection device utilizing the phase difference system, which is to be used during the reproduction step, but also the additional error detection device utilizing the push-pull system, which is to be used during the recording step, on the side of the recording and reproducing apparatus. As a result, a photo detecting element having four divided sections had to be used in order to cope with the above-mentioned requirements. In addition, the multi-layer structure does not provide a sufficient amount of reflected light and only the push-pull system and the phase difference system are incapable of coping with the disc having a groove, which has not as yet been subjected to a recording step, thus causing technical problems.

SUMMARY OF THE INVENTION

An object of the present invention is therefore to provide system and method for detecting a tracking error, which perform to make a detection of tracking error signals with high quality for various kinds of optical discs such as a reproduction-only type, a recordable type, a rewritable type, a single-layer type and a multiple-layer type.

In order to attain the aforementioned object, the system of the first aspect of the present invention for detecting a tracking error, which is to be applied to a tracking servo for causing a light beam to follow a track of an optical disc, comprises:

a light detecting device for detecting light reflected from said optical disc, said light detecting device comprising two photo detecting elements, which are disposed separately from each other in a direction corresponding to a radius direction of the optical disc;

two oscillating devices for generating sine waves, said sine waves having amplitudes based on output levels of said two photo detecting elements, respectively, said sine waves having an identical frequency to each other and being synchronized with each other;

a first delay device for adding a predetermined amount of delay to the sine wave, which is generated by one of said two oscillating devices, to delay said sine wave;

a second delay device for adding a same amount of delay as said predetermined amount of delay to the sine wave, which is generated by another of said two oscillating devices, to delay said sine wave;

a first adding device for adding a signal of the sine wave generated by said one of said two oscillating devices to a signal of the sine wave as delayed by said first delay device, to output a first added signal;

a second adding device for adding the signal of the sine wave generated by said one of said two oscillating devices to a signal of the sine wave as delayed by said second delay device, to output a second added signal; and a phase comparison device for comparing said first added signal with said second added signal to make a comparison in phase between sine waves based on said first and second added signal, so as to provide a comparison result, and generating and outputting a tracking error signal based on said comparison result.

According to the tracking error detecting system of the first aspect of the present invention, it is possible to detect the tracking error signal with high quality to ensure a high accuracy tracking, even when an optical disc having a track, which is to be followed by the light beam through the tracking servo, is for example a multiple-layer optical disc having a small amount of reflected light or an optical disc with a groove, which has not as yet been subjected to a recording step.

The photo detecting elements are disposed on the both sides of the track, i.e., the outer and inner peripheral sides relative to the track in the radius direction of the optical disc, respectively. Deviation of the beam to the outer peripheral side in the radius direction of the optical disc leads to an increased output from the photo detecting element, which is disposed on the outer peripheral side and a decreased output from the photo detecting element, which is disposed on the inner peripheral side. On the other hand, deviation of the beam to the inner peripheral side in the radius direction of the optical disc leads to an increased output from the photo detecting element, which is disposed on the inner peripheral side and a decreased output from the photo detecting element, which is disposed on the outer peripheral side. The push-pull system utilizes the error signal as generated for the tracking servo. On the contrary, in the present invention, there are generated the sine waves, which have amplitudes based on the output levels of the photo detecting elements and the identical frequency to each other and are synchronized with each other; the same amount of delay is applied to the respective sine waves; a signal of any one of the original sine waves is added to a signal of the sine wave as delayed; a comparison is made in phase between sine waves based on the added signal, so as to provide a comparison result; and the comparison result is used as the tracking error signal.

The thus obtained tracking error is not susceptible to an amount of reflected light and an increased amount of delay leads to a higher sensitivity. It is however preferable to determine an optimum amount of delay, taking into consideration an S/N (signal-to-noise) ratio of the signal, due to the fact that the level of the signal inputted to the phase comparison device decreases according as the amount of delay increases.

The photo detecting elements have the same structure as that applied to the push-pull system, thus leading to no incorporation of any specifically dedicated photo detecting elements. A circuit for the push-pull system may be provided additionally so as to easily switch between the selective modes.

In the second aspect of the present invention, the tracking error detecting system may further comprises a low-pass filter for enabling only a low frequency component of an output from said two photo detecting elements to pass.

According to the feature of the second aspect of the present invention, the high frequency components according to the pits corresponding to the recorded information can be removed. The tracking error signal may include the high frequency components according to the pits when reproducing or rewriting the optical disc on which the information has already been recorded, thus deteriorating the S/N ratio of the tracking error signal. Passing the signals into the low-pass filter provides an error signal including only the low frequency component, which is required for the tracking.

In the third aspect of the present invention, the tracking error detecting system may further comprises a generated frequency setting device for setting a generated frequency for each of said two oscillating devices.

According to the feature of the third aspect of the present invention, it is possible to set an appropriate frequency corresponding to the output level of the photo detecting element, for the tracking servo. An easy setting of the optimum frequency for the tracking servo can therefore be achieved.

In the fourth aspect of the present invention, the tracking error detecting system may further comprises a delay amount setting device for setting an amount of delay for each of said first delay device and said second delay device.

According to the feature of the fourth aspect of the present invention, it is possible to set the optimum amount of delay for the tracking servo. An easy setting of the optimum amount of delay based on the type or the frequency of the optical disc can therefore be achieved.

In order to attain the aforementioned object, the system of the fifth aspect of the present invention for detecting a tracking error, which is to be applied to a tracking servo for causing a light beam to follow a track of an optical disc, comprises:

a light detecting device for detecting light reflected from said optical disc, said light detecting device comprising four photo detecting elements, which are disposed separately from each other in a direction corresponding to a radius direction of the optical disc and in a direction corresponding to a tangential line to said track;

four oscillating devices for generating sine waves, said sine waves having amplitudes based on output levels of said four photo detecting elements, respectively, said sine waves having an identical frequency to each other and being synchronized with each other, said four oscillating devices comprising two outer oscillating devices and two inner oscillating devices relative to said track;

a first delay device for adding a predetermined amount of delay to the sine wave, which is generated by one of said two outer oscillating devices, to delay said sine wave;

a second delay device for adding a same amount of delay as said predetermined amount of delay to the sine wave, which is generated by one of said two inner oscillating devices, to delay said sine wave;

a first adding device for adding a signal of the sine wave generated by another of said two outer oscillating devices to a signal of the sine wave as delayed by said second delay device, to output a first added signal;

a second adding device for adding the signal of the sine wave generated by another of said two inner oscillating devices to a signal of the sine wave as delayed by said first delay device, to output second added signal; and a phase comparison device for comparing said first added signal with said second added signal to make a comparison in phase between sine waves based on said first and second added signals, so as to provide a comparison result, and generating and outputting a tracking error signal based on said comparison result.

According to the tracking error detecting system of the fifth aspect of the present invention, it is possible to detect the tracking error signal with high quality to ensure a high accuracy tracking, even when an optical disc having a track, which is to be followed by the light beam through the tracking servo, is for example a multiple-layer optical disc having a small amount of reflected light or an optical disc with a groove, which has not as yet been subjected to a recording step.

The photo detecting elements are disposed on the both sides of the track, i.e., the outer and inner peripheral sides relative to the track in the radius direction of the optical disc, respectively, on the upstream and downstream positions in the tracking direction, i.e., the time base direction, thus providing four photo detecting elements. Deviation of the beam to the outer peripheral side in the radius direction of the optical disc leads to an increased output from the two photo detecting elements, which are disposed on the outer peripheral side and a decreased output from the two photo detecting elements, which are disposed on the inner peripheral side. On the other hand, deviation of the beam to the inner peripheral side in the radius direction of the optical disc leads to an increased output from the two photo detecting elements, which are disposed on the inner peripheral side and a decreased output from the two photo detecting elements, which are disposed on the outer peripheral side. In the present invention, there are generated the sine waves, which have amplitudes based on the output levels of the photo detecting elements and the identical frequency to each other and are synchronized with each other; the same amount of delay is applied to the respective sine waves; a signal of any one of the original sine waves is added to a signal of the sine wave as delayed; a comparison is made in phase between sine waves based on the added signal, so as to provide a comparison result; and the comparison result is used as the tracking error signal.

The thus obtained tracking error is not susceptible to an amount of reflected light and an increased amount of delay leads to a higher sensitivity. It is however preferable to determine an optimum amount of delay, taking into consideration an S/N (signal-to-noise) ratio of the signal, due to the fact that the level of the signal inputted to the phase comparison device decreases according as the amount of delay increases.

The photo detecting elements have the same structure as that applied to the phase difference system, thus leading to no incorporation of any specifically dedicated photo detecting elements. A circuit for the phase difference system may be provided additionally so as to easily switch between the selective modes.

In the sixth aspect of the present invention, the tracking error detecting system may further comprises a low-pass filter for enabling only a low frequency component of an output from said four photo detecting elements to pass.

According to the feature of the sixth aspect of the present invention, the high frequency components according to the pits corresponding to the recorded information can be removed. The tracking error signal may include the high frequency components according to the pits when reproducing or rewriting the optical disc on which the information has already been recorded, thus deteriorating the S/N ratio of the tracking error signal. Passing the signals into the low-pass filter provide an error signal including only the low frequency component, which is required for the tracking.

In the seventh aspect of the present invention, the tracking error detecting system may further comprises a generated frequency setting device for setting a generated frequency for each of said four oscillating devices.

According to the feature of the seventh aspect of the present invention, it is possible to set an appropriate frequency corresponding to the output level of the photo detecting element, for the tracking servo. An easy setting of the optimum frequency for the tracking servo can therefore be achieved.

In the eighth aspect of the present invention, the tracking error detecting system may further comprises a delay amount setting device for setting an amount of delay for each of said first delay device and said second delay device.

According to the feature of the eighth aspect of the present invention, it is possible to set the optimum amount of delay for the tracking servo. An easy setting of the optimum amount of delay based on the type or the frequency of the optical disc can therefore be achieved.

In order to attain the aforementioned object, the method of the ninth aspect of the present invention for detecting a tracking error, which is to be applied to a tracking servo for causing a light beam to follow a track of an optical disc, comprises:

a light detection step for detecting light reflected from said optical disc, utilizing two photo detecting elements, which are disposed separately from each other in a direction corresponding to a radius direction of the optical disc;

two oscillation steps for generating sine waves having amplitudes based on output levels of said two photo detecting elements, respectively, said sine waves having an identical frequency to each other and being synchronized with each other;

a first delay step for adding a predetermined amount of delay to the sine wave, which is generated by one of said two oscillation steps, to delay said sine wave;

a second delay step for adding a same amount of delay as said predetermined amount of delay to the sine wave, which is generated by another of said two oscillation steps, to delay said sine wave;

a first addition step for adding a signal of the sine wave generated by said one of said two oscillation steps to a signal of the sine wave as delayed by said first delay device, to output a first added signal;

a second addition step for adding the signal of the sine wave generated by said one of said two oscillation steps to a signal of the sine wave as delayed by said second delay device, to output a second added signal; and a phase comparison step for comparing said first added signal with said second added signal to make a comparison in phase between sine waves based on said first and second added signals, so as to provide a comparison result, and generating and outputting a tracking error signal based on said comparison result.

According to the tracking error detecting method of the eighth aspect of the present invention, it is possible to detect the tracking error signal with high quality to ensure a high accuracy tracking, even when an optical disc having a track, which is to be followed by the light beam, is for example a multiple-layer optical disc having a small amount of reflected light or an optical disc with a groove, which has not as yet been subjected to a recording step. The photo detecting elements are disposed on the both sides of the track, i.e., the outer and inner peripheral sides relative to the track in the radius direction of the optical disc, respectively. There are generated the sine waves, which have amplitudes based on the output levels of the photo detecting elements and the identical frequency to each other and are synchronized with each other; the same amount of delay is applied to the respective sine waves; a signal of any one of the original sine waves is added to a signal of the sine wave as delayed; a comparison is made in phase between sine waves based on the added signal, so as to provide a comparison result; and the comparison result is used as the tracking error signal.

In order to attain the aforementioned object, the method of the tenth aspect of the present invention for detecting a tracking error, which is to be applied to a tracking servo for causing a light beam to follow a track of an optical disc, comprises:

a light detecting step for detecting light reflected from said optical disc, utilizing four photo detecting elements, which are disposed separately from each other in a direction corresponding to a radius direction of the optical disc and in a direction corresponding to a tangential line to said track;

four oscillating steps for generating sine waves having amplitudes based on output levels of said four photo detecting elements, respectively, said sine waves having an identical frequency to each other and being synchronized with each other, said four oscillating steps comprising two outer oscillating steps carried out on an outer side relative to said track and two inner oscillating steps carried out on an inner side relative thereto;

a first delay step for adding a predetermined amount of delay to the sine wave, which is generated by one of said two outer oscillating steps, to delay said sine wave;

a second delay step for adding a same amount of delay as said predetermined amount of delay to the sine wave, which is generated by one of said two inner oscillating steps, to delay said sine wave;

a first adding step for adding a signal of the sine wave generated by another of said two outer oscillating steps to a signal of the sine wave as delayed by said second delay step, to output a first added signal;

a second adding step for adding the signal of the sine wave generated by another of said two inner oscillating steps to a signal of the sine wave as delayed by said first delay step, to output a second added signal; and a phase comparison step for comparing said first added signal with said second added signal to make a comparison in phase between sine waves based on said first and second added signals, so as to provide a comparison result, and generating and outputting a tracking error signal based on said comparison result.

According to the tracking error detecting method of the tenth aspect of the present invention, the photo detecting elements are disposed on the both sides of the track, i.e., the outer and inner peripheral sides relative to the track in the radius direction of the optical disc, respectively, on the upstream and downstream positions in the tracking direction, i.e., the time base direction, thus providing four photo detecting elements. There are generated the sine waves, which have amplitudes based on the output levels of the photo detecting elements and the identical frequency to each other and are synchronized with each other; the same amount of delay is applied to the respective sine waves; a signal of any one of the original sine waves is added to a signal of the sine wave as delayed; a comparison is made in phase between sine waves based on the added signal, so as to provide a comparison result; and the comparison result is used as the tracking error signal.

The above-mentioned functions and the other advantages provided by the present invention will be clearly understood from the embodiments described below.

BRIEF DESCRIPTION OF THE DRAWINGS

FIG. 3 is a view showing the wave of a tracking error signal, which is detected by the tracking error detecting system of the first embodiment of the present invention;

FIG. 8 is a block diagram illustrating the structure of a disc information recording and reproducing apparatus provided with the tracking error detecting system of the present invention.

DETAILED DESCRIPTION OF THE PREFERRED EMBODIMENTS

[First Embodiment]

Figure 1:
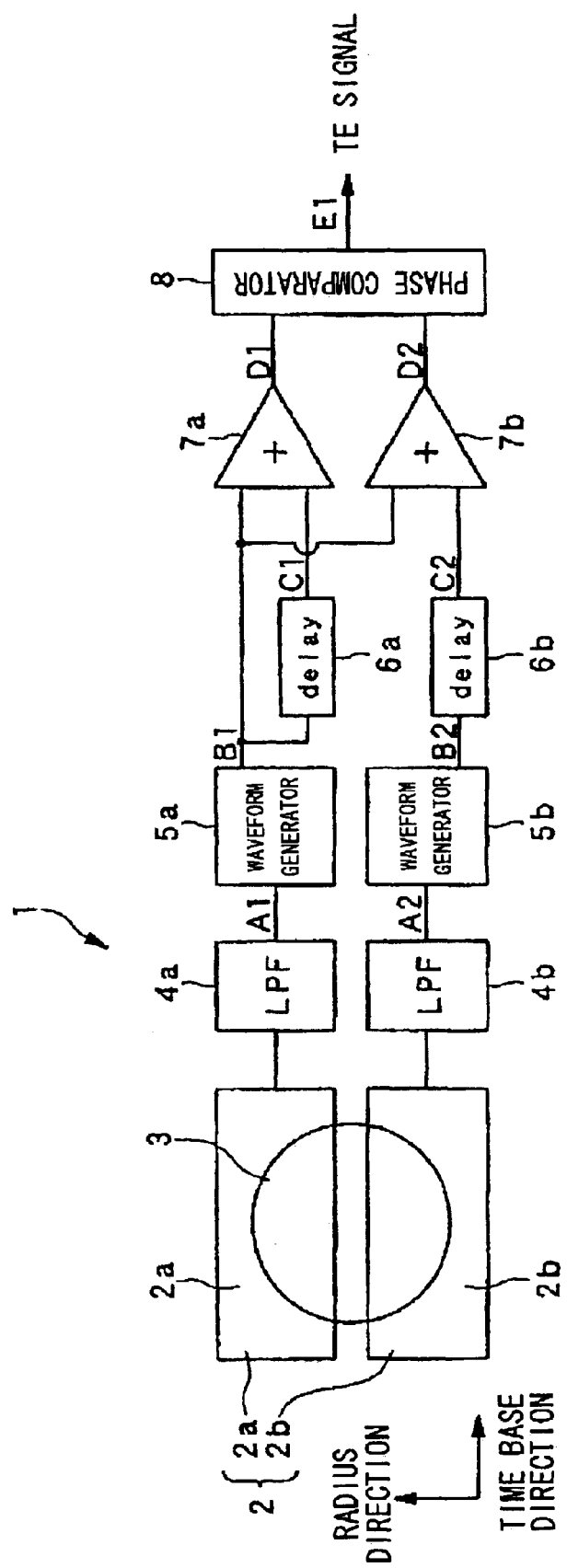
FIG. 1 is a block diagram illustrating the tracking error detecting system of the first embodiment of the present invention.

Now, the first embodiment of the tracking error detecting system of the present invention will be described in detail below with reference to FIGS. 1 to 3. FIG. 1 is a block diagram illustrating the tracking error detecting system of the first embodiment of the present invention, FIGS. 2(a), 2(b), 2(c) and 2(d) are views illustrating signal waves in the respective sections of the tracking error detecting system of the first embodiment of the present invention and FIG. 3 is a view illustrating the wave of a tracking error signal, which is detected by the tracking error detecting system of the first embodiment of the present invention.

The tracking error detecting system 1 of the first embodiment of the present invention includes a two-divided type detector 2 serving as a light detecting device; LPFs (Low Pass Filters) 4a and 4b; a first waveform generator 5a serving as one of two oscillating devices; a second waveform generator 5b serving as the other of two oscillating devices; a first delay circuit 6a serving as a first delay device; a second delay circuit 6b serving as a second delay device; a first adder 7a serving as a first adding device; a second adder 7b serving as a second adding device; and a phase comparator 8 serving as a phase comparison device, as shown in FIG. 1.

The two-divided type detector 2 is provided with two photo detecting elements 2a and 2b, which are disposed separately from each other in the direction corresponding to the radius direction of an optical disc. The LPFs 4a and 4b remove the high frequency components from the outputs of the photo detecting elements 2a and 2b, respectively. The first waveform generator 5a generates a sine wave B1, which has the predetermined frequency, with the amplitude corresponding to the output level of a signal A1, which has passed the LPF 4a. The second waveform generator 5b generates a sine wave B2, which has the identical frequency to the sine wave B1 generated by the first waveform generator 5a, with the amplitude corresponding to the output level of a signal A2, which has passed the LPF 4b. The first delay circuit 6a delays the sine wave B1 by the prescribed amount of delay to form a sine wave C1. The second delay circuit 6b delays the sine wave B2 by the same amount of delay as the sine wave B1 to form a sine wave C2. The first adder 7a adds a signal of the sine wave B1 to a signal of the sine wave C1 to output the first added signal D1. The second adder 7b adds a signal of the sine wave B1 to a signal of the sine wave C2 to output the second added signal D2. The phase comparator 8 compares the first added signal D1 from the first adder 7a with the second added signal D2 from the second adder 7b, to output a signal E1 serving as the comparison result. The signal E1 outputted from the phase comparator 8 is utilized as a TE (tracking error) signal.

The photo detecting elements 2a and 2b detect light reflected from the optical disc in a beam spot 3. Deviation of the beam spot 3 from the track leads to intensity distribution of the reflected light, which is asymmetrical relative to the radius direction. Consequently, the photo detecting elements 2a and 2b output voltages corresponding to the respective amounts of reflected light. In FIG. 1, the "TIME BASE DIRECTION" means the direction of the track of the optical disc.

The signals when reproducing the optical disc on which information has been recorded include high frequency components due to pits (i.e., marks corresponding to recorded information). The LPFs 4a and 4b remove the above-mentioned high frequency components from the signals so as to prevent these high frequency components from being included in the error signal. The outputs from the LFFs 4a and 4b vary in correspondence with an amount of tracking error.

The first waveform generator 5a and the second waveform generator 5b generate the sine waves B1 and B2, respectively, which have the same frequency and are synchronized with each other, with amplitudes corresponding to the output voltage levels of the LPFs 4a and 4b, respectively. The first waveform generator 5a and the second waveform generator 5b may be composed utilizing for example a PLL (Phase Locked Loop) in order to ensure the synchronized and identical frequency. Devices (not shown) for adjusting the generated frequencies of the first waveform generator 5a and the second waveform generator 5b may be provided.

The first and second delay circuits 6a and 6b delay the sine waves B1 and B2, which have been generated by the first and second waveform generators 5a and 5b, by the same amount of delay, to form the sine waves C1 and C2, respectively. Devices (not shown) for adjusting the amounts of delay caused by the first and second delay circuits 6a and 6b may be provided. The first and second delay circuits 6a and 6b may be composed utilizing for example a CCD (Charge Coupled Device) so that the amount of delay can be set by selecting any one of output stages of the CCD or changing a transfer frequency of the CCD.

The first adder 7a adds the signal of the sine wave B1 to the signal of the sine wave C1 to output the first added signal D1. The second adder 7b adds the signal of the sine wave B2 to the signal of the sine wave C2 to output the second added signal D2. An OPAMP (Operational Amplifier) for general purpose use may be applicable to the first and second adders 7a, 7b.

The phase comparator 8 makes comparison in phase between the output D1 from the first adder 7a and the output D2 from the second adder 7b, to output the signal E1 serving as the comparison result. The output E1 from the phase comparator 8 is utilized as the TE (tracking error) signal, which is to be supplied to a circuit for the tracking servo.

The photo detecting elements 2a and 2b have the same structure as that applied to the push-pull system. If a circuit for the push-pull system is provided, it is possible to select the tracking servo utilizing the push-pull system.

Now, operation of the tracking error detecting system 1 of the first embodiment of the present invention will be described with reference to FIGS. 2(a) to 2(d).

Figure 2A:
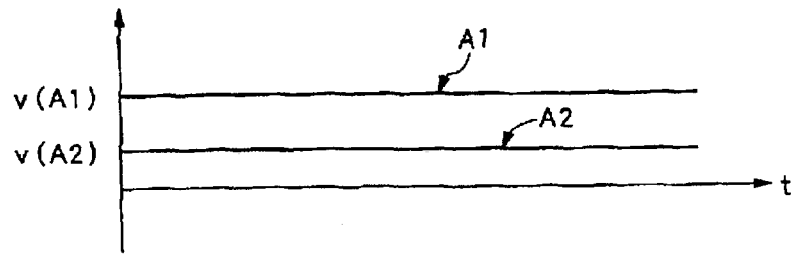
FIGS. 2(a), 2(b), 2(c) and 2(d) are views showing signal waves in the respective sections of the tracking error detecting system of the first embodiment of the present invention.

FIG. 2(a) shows the waveforms based on the signals A1 and A2, respectively, in which the high frequency components have been removed through the LPFs 4a and 4b from the outputs from the photo detecting elements 2a and 2b, respectively. FIG. 2(a) in which the signal A1 has the higher level than the signal A2, thus causing the track deviation, means a state where the photo detecting element 2a receives the reflected light in a larger amount than the photo detecting element 2b.

Figure 2B:
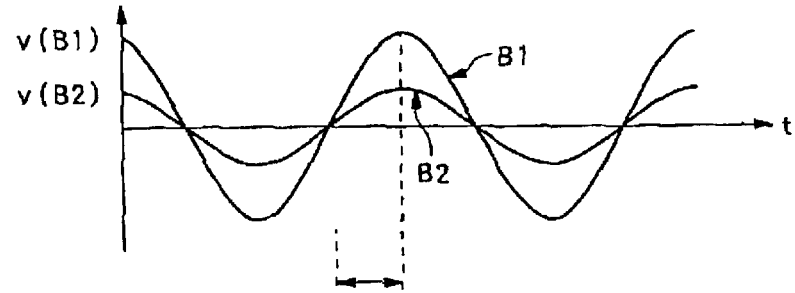

FIG. 2(b) shows the waveforms of the sine waves B1 and B2 generated by the first and second waveform generators 5a and 5b, respectively. The sine waves B1 and B2, which are synchronized with each other with the same frequency, have the amplitudes corresponding to the levels of the signals A1 and A2. If the generated frequency is expressed by the formula "f=ω/2π", the sine waves B1 and B2 are expressed by the following formulae (1) and (2), respectively:

the sine wave $B1(t) = \alpha \cos(\omega t)$ $[\alpha = v(B1)]$ (1)

the sine wave $B2(t) = \beta \cos(\omega t)$ $[\beta = v(B2)]$ (2)

Figure 2C:
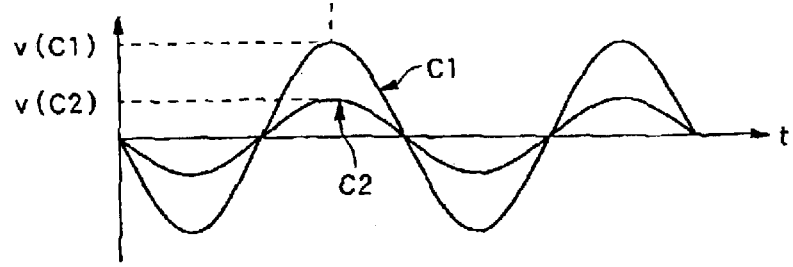

FIG. 2(c) shows the waveforms of the sine waves C1 and C2, which are obtained by delaying the sine waves B1 and B2 through the first and second delay circuits 6a and 6b, respectively. The sine waves C1 and C2 are expressed by the following formulae (3) and (4), respectively:

the sine wave $C1(t) = \alpha \cos(\omega t + \psi)$ (3)

the sine wave $C2(t) = \beta \cos(\omega t + \psi)$ (4)

wherein, "ψ" being an amount of delay.

Figure 2D:
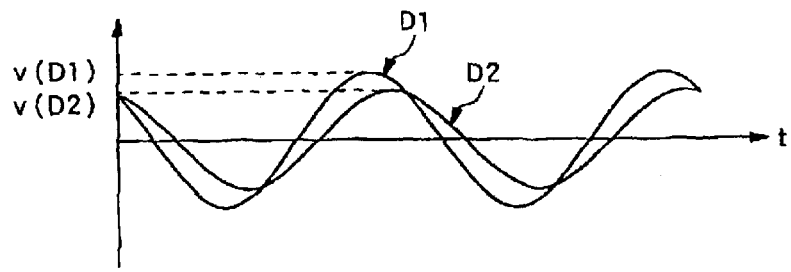

FIG. 2(d) shows the waveform of the signal D1, which is obtained by adding the signal of the sine wave B1 to the signal of the sine wave C1 by means of the first adder 7a, and the waveform of the signal D2, which is obtained by adding the signal of the sine wave B1 to the signal of the sine wave C2 by means of the second adder 7b. The waveforms based on the signals D1 and D2 are expressed by the following formulae (5) and (6), respectively:

the signal $$D1(t) = \alpha \cos(\omega t) + \alpha \cos(\omega t + \psi) \qquad (5)$$
$$= C_1 \cos(\omega t + \theta_1) \text{ [wherein, } C_1 \text{ being a constant]}$$

the signal $$D2(t) = \alpha \cos(\omega t) + \beta \cos(\omega t + \psi) \qquad (6)$$
$$= C_2 \cos(\omega t + \theta_2) \text{ [wherein, } C_2 \text{ being a constant]}$$

wherein, $\theta_1 = \tan^{-1}[(-\sin \psi)/(1 + \cos \psi)]$ $\theta_2 = \tan^{-1}[(-\beta \sin \psi)/(\alpha + \beta \cos \psi)]$ FIG. 3 shows the waveform of the output E1 from the phase comparator 8. The waveform based on the output E1 is expressed by the following formula (7):

$$E1(v) = \theta_2 - \theta_1 \qquad (7)$$
$$= \tan^{-1}\{[(\alpha - \beta)/(\alpha + \beta)]\tan(\psi/2)\}$$

The term "$(\alpha - \beta)/(\alpha + \beta)$" in the formula, which is obtained by standardizing the tracking error signal in the push-pull system through the amount of reflected light, includes the tracking positional information. The output E1 becomes the tracking error signal, unless ψ is null (ψ=0). Utilizing the standardization through the amount of reflected light makes it possible to obtain, even from the multi-layer optical disc having a small amount of reflected light, the error signal with amplitude having substantially the same level as the single-layer optical disc.

In FIG. 3, a point "Pn" denotes the "n"th track and a point "Pn+1", the "n+1"th track. The track is placed in this proper position in the normal tracking state. When the track deviates from the proper position by "Δd", the output E1 becomes "v1" or "v2". The signal "v1" or "v2" is supplied as the tracking error signal to the tracking servo to make a control so that the track is placed in the position of point "Pn".

As is apparent from the formula 7, the output E1 is a function of the phase delay "ψ". Consequently, the error detecting sensitivity becomes higher according as an amount of phase delay "ψ" becomes larger. More specifically, the output E1 becomes "v1" when the phase delay "ψ" is 90 degrees (ψ=90°) and the output E1 becomes "v2" when the phase delay "ψ" is 120 degrees (ψ=120°). Although the larger amount of phase delay "ψ" is preferable only in such an aspect, the phase delay "ψ" exceeding 90 degrees leads to deterioration of the outputs of the signal D1(t) and the signal D2(t), as is apparent from the formulae 5 and 6. An appropriate phase delay "ψ" has to be determined, taking into consideration the matters such as the S/N ratio.

[Second Embodiment]

Figure 4:
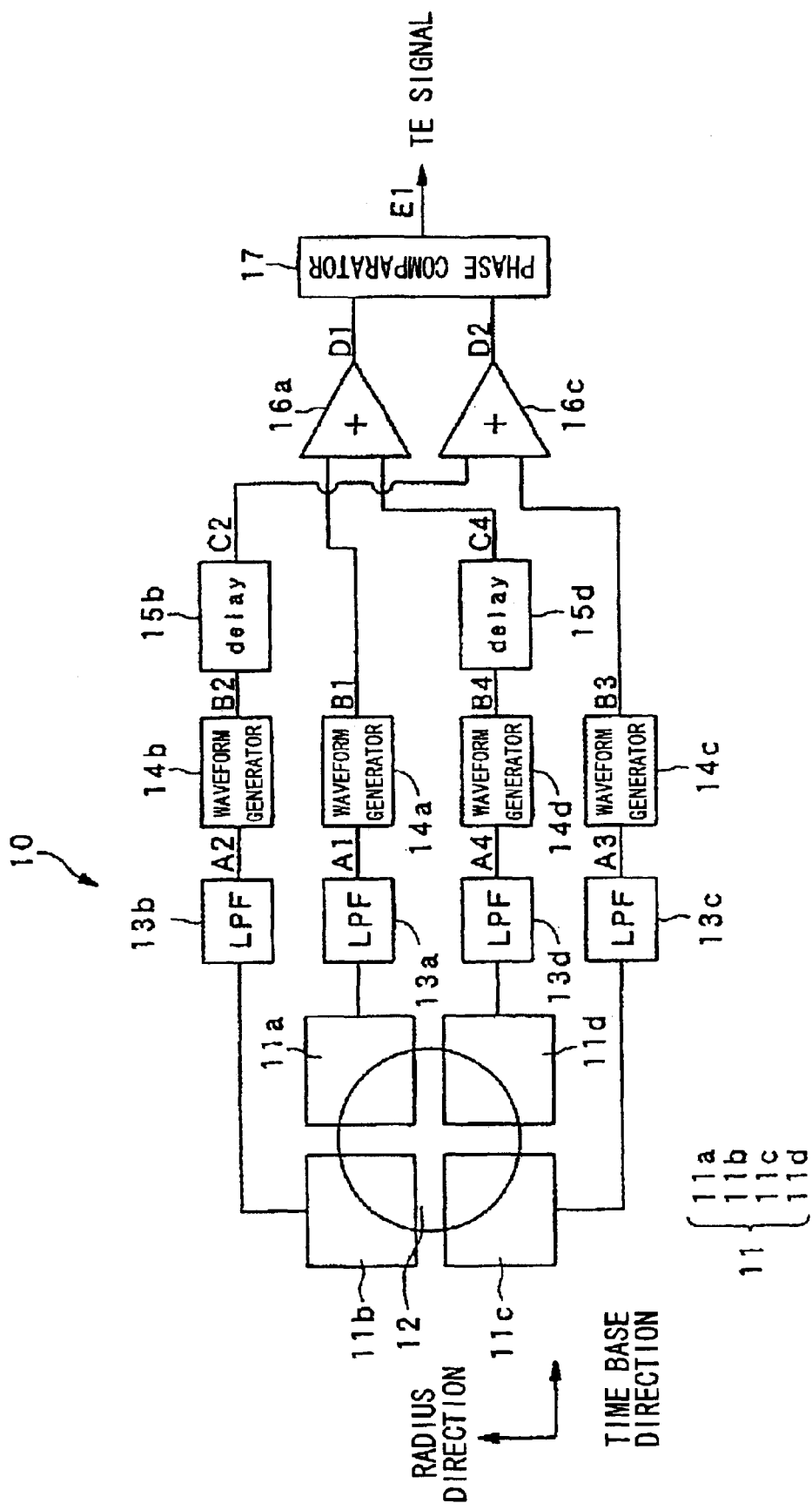
FIG. 4 is a block diagram illustrating the tracking error detecting system of the second embodiment of the present invention.

Now, the second embodiment of the tracking error detecting system of the present invention will be described in detail below with reference to FIGS. 4 and 5(a) to 5(d). FIG. 4 is a block diagram illustrating the tracking error detecting system of the second embodiment of the present invention, and FIGS. 5(a), 5(b), 5(c) and 5(d) are views illustrating signal waves in the respective sections of the tracking error detecting system of the second embodiment of the present invention. The description of the second embodiment will be given also with reference with FIG. 3, which shows the tracking error signal and is utilized to describe the first embodiment of the present invention.

The tracking error detecting system 10 of the second embodiment of the present invention includes a four-divided type detector 11 serving as the light detecting device; LPFs (Low Pass Filters) 13a to 13d; and first to fourth waveform generators 14a to 14d serving as four oscillating devices, as shown in FIG. 4.

The four-divided type detector 11 is provided with four photo detecting elements 11a to 11d, which are disposed separately from each other in the direction corresponding to the radius direction of the optical disc and in the time base direction (i.e., the direction corresponding to the tangential line to the track). The LPFs 13a to 13d remove the high frequency components from the outputs of the photo detecting elements 11a to 11d, respectively. The first waveform generator 14a generates a sine wave B1 with the amplitude corresponding to the output level of a signal A1, which has passed the LPF 13a. The second waveform generator 14b generates a sine wave B2 with the amplitude corresponding to the output level of a signal A2, which has passed the LPF 13b. The third waveform generator 14c generates a sine wave B3 with the amplitude corresponding to the output level of a signal A3, which has passed the LPF 13c. The fourth waveform generator 14d generates a sine wave B4 with the amplitude corresponding to the output level of a signal A4, which has passed the LPF 13d. The sine waves B1 to B4 generated by means of the first to fourth waveform generators 14a to 14d have the same frequency and are synchronized with each other.

In addition, the tracking error detecting system 10 of the second embodiment of the present invention includes a first delay circuit 15b serving as a first delay device; a second delay circuit 15d serving as a second delay device; a first adder 16a serving as a first adding device; a second adder 16c serving as a second adding device; and a phase comparator 17 serving as a phase comparison device.

The first delay circuit 15b delays the sine wave B2 by the prescribed amount of delay to form a sine wave C2. The second delay circuit 15d delays the sine wave B4 by the same amount of delay as the sine wave B2 to form a sine wave C4. The first adder 16a adds a signal of the sine wave B1 to a signal of the sine wave C4 to output the first added signal D1. The second adder 16c adds a signal of the sine wave B3 to a signal of the sine wave C2 to output the second added signal D2. The phase comparator 17 compares the first added signal D1 from the first adder 16a with the second added signal D2 from the second adder 16b, to output a signal E1 serving as the comparison result. The signal E1 outputted from the phase comparator 17 is utilized as a TE (tracking error) signal.

The photo detecting elements 11a to 11d detect the reflected light in correspondence with the position of the pit of the optical disc relative to the beam spot 3.

The signals when reproducing the optical disc on which information has been recorded include high frequency components due to pits. The LPFs 13a to 13d remove the above-mentioned high frequency components from the signals so as to prevent these high frequency components from being included in the error signal.

The first to fourth waveform generators 14a to 14d generate the sine waves B1 to B4, respectively, which have the same frequency and are synchronized with each other, with amplitudes corresponding to the output voltage levels of the LPFs 13a to 13d, respectively. The first to fourth waveform generators 14a to 14d may be composed utilizing for example the PLL (Phase Locked Loop) in order to ensure the synchronized and identical frequency. Devices (not shown) for adjusting the generated frequencies of the first to fourth waveform generators 14a to 14d may be provided.

The first and second delay circuits 15b and 15d delay the sine waves B2 and B4, which have been generated by the second and fourth waveform generators 14b and 14d, by the same amount of delay, to form the sine waves C2 and C4, respectively. Devices (not shown) for adjusting the amounts of delay caused by the first and second delay circuits 15b and 15d may be provided. The first and second delay circuits 15b and 15d may be composed utilizing for example the CCD (Charge Coupled Device) so that the amount of delay can be set by selecting any one of output stages of the CCD or changing a transfer frequency of the CCD.

The first adder 16a adds the signal of the sine wave B1 to the signal of the sine wave C4 to output the first added signal D1. The second adder 16cb adds the signal of the sine wave B3 to the signal of the sine wave C2 to output the second added signal D2. An OPAMP (Operational Amplifier) for general purpose use may be applicable to the first and second adders 16a and 16c.

The phase comparator 17 makes comparison in phase between the output D1 from the first adder 16a and the output D2 from the second adder 16c, to output the signal E1 serving as the comparison result. The output E1 from the phase comparator 17 is utilized as the TE (tracking error) signal, which is to be supplied to a circuit for the tracking servo.

The photo detecting elements 11a to 11d have the same structure as that applied to the phase difference system. If a circuit for the phase difference system is provided, it is possible to select the tracking servo utilizing the phase difference system.

Now, operation of the tracking error detecting system 10 of the second embodiment of the present invention will be described with reference to FIGS. 5(a) to 5(d).

Figure 5A:
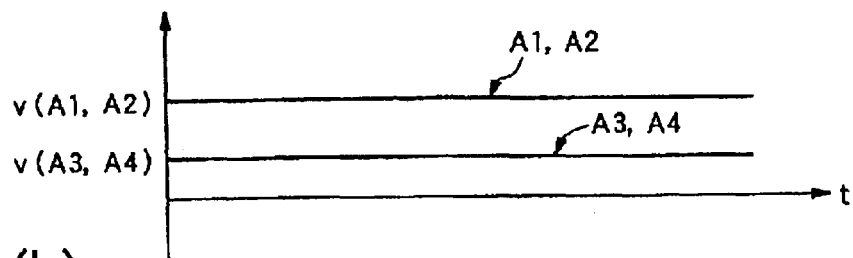
FIGS. 5(a), 5(b), 5(c) and 5(d) are views showing signal waves in the respective sections of the tracking error detecting system of the second embodiment of the present invention.

FIG. 5(a) shows the waveforms based on the signals A1 to A4, in which the high frequency components have been removed through the LPFs 13a to 13d from the outputs from the photo detecting elements 11a to 11d, respectively. FIG. 5(a) in which the signals A1, A2 have the higher level than the signals A3, A4, thus causing the track deviation, means a state where the photo detecting elements 11a, 11b receive the reflected light in a larger amount than the photo detecting elements 11c, 11d.

Figure 5B:
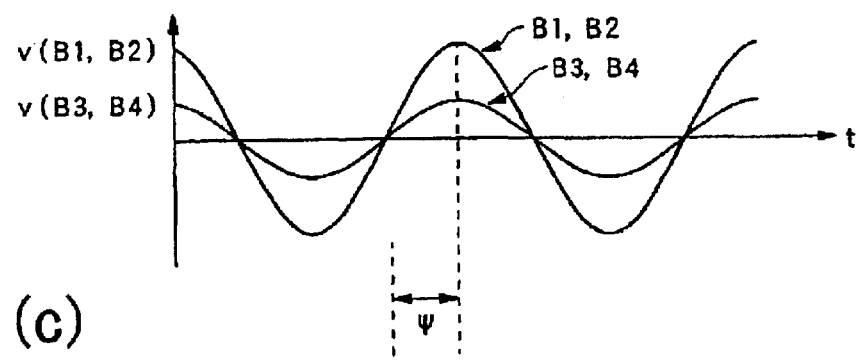

FIG. 5(b) shows the waveforms of the sine waves B1 to B4 generated by the first to fourth waveform generators 14a to 14d, respectively. The sine waves B1 to B4, which are synchronized with each other with the same frequency, have the amplitudes corresponding to the levels of the signals A1 to A4. The photo detecting elements 11a, 11b are placed on the same side relative to the track and the photo detecting elements 11c, 11d are placed on the opposite side to the above-mentioned photo detecting elements 11a, 11b so that the signals A1 and A2 become substantially identical to each other in temporal average and the signals A3 and A4 also become substantially identical to each other therein. If the generated frequency is expressed by the formula "f=ω/2π", the sine waves B1, B2 and the sine waves B3, B4 are expressed by the following formulae (8) and (9), respectively:
the sine wave $$B1(t) = \text{the sine wave } B2(t) \quad (8)$$

$$= \alpha \cos(\omega t) \quad [\alpha = v(B1 = B2)]$$

the sine wave $$B3(t) = \text{the sine wave } B4(t) \quad (9)$$

$$= \beta \cos(\omega t) \quad [\beta = v(B3 = B4)]$$

Figure 5C:
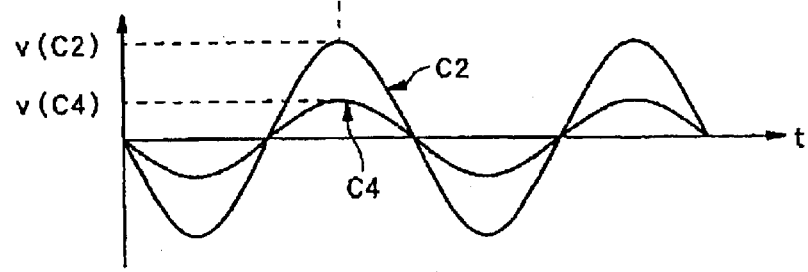

FIG. 5(c) shows the waveforms of the sine waves C2 and C4, which are obtained by delaying the sine waves B2 and B4 through the first and second delay circuits 15b and 15d, respectively. The sine waves C2 and C4 are expressed by the following formulae (10) and (11), respectively:

$$\text{the sine wave } C2(t) = \alpha \cos(\omega t + \psi) \quad (10)$$

$$\text{the sine wave } C4(t) = \beta \cos(\omega t + \psi) \quad (11)$$

wherein, "ψ" being an amount of delay.

Figure 5D:
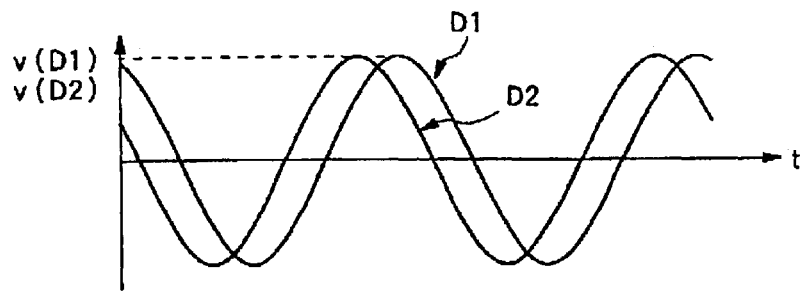

FIG. 5(d) shows the waveform of the signal D1, which is obtained by adding the signal of the sine wave B1 to the signal of the sine wave C4 by means of the first adder 16a, and the waveform of the signal D2, which is obtained by adding the signal of the sine wave B3 to the signal of the sine wave C2 by means of the second adder 16c. The waveforms based on the signals D1 and D2 are expressed by the following formulae (12) and (13), respectively:
the signal $$D1(t) = \alpha\cos(\omega t) + \alpha\cos(\omega t + \psi) \quad (12)$$

$$= C_3 \cos(\omega t + \theta_3) \quad [\text{wherein, } C_3 \text{ being a constant}]$$

the signal $$D2(t) = \alpha\cos(\omega t + \psi) + \beta\cos(\omega t) \quad (13)$$

-continued $$= C_4 \cos(\omega t + \theta_4) \quad [\text{wherein, } C_4 \text{ being a constant}]$$

wherein, $$\theta_3 = \tan^{-1}[(-\beta \sin \psi)/(\alpha + \beta \cos \psi)]$$

$$\theta_4 = \tan^{-1}[(-\alpha \sin \psi)/(\beta + \alpha \cos \psi)]$$

The output E1 from the phase comparator 17 has the similar waveform to that as shown in FIG. 3. The waveform based on the output E1 is expressed by the following formula (14):

$$E1(v) = \theta_4 - \theta_3 \quad (14)$$

$$= \tan^{-1}\{(\alpha - \beta)(\alpha + \beta)\sin\psi / [2\alpha\beta + (\alpha^2 + \beta^2)\cos\psi]\}$$

Also in the formula 14, the output E1 becomes the tracking error signal, unless ψ is null (ψ=0). It is also possible to obtain, even from the multi-layer optical disc having a small amount of reflected light, the error signal with amplitude having substantially the same level as the single-layer optical disc. An appropriate phase delay "ψ" has to be determined, taking into consideration the relationship between the position of the track and the tracking error detecting signal, as well as the matters such as the S/N ratio, in the same manner as the first embodiment of the present invention,

[Push-Pull System and Phase Difference System]

Figure 6:
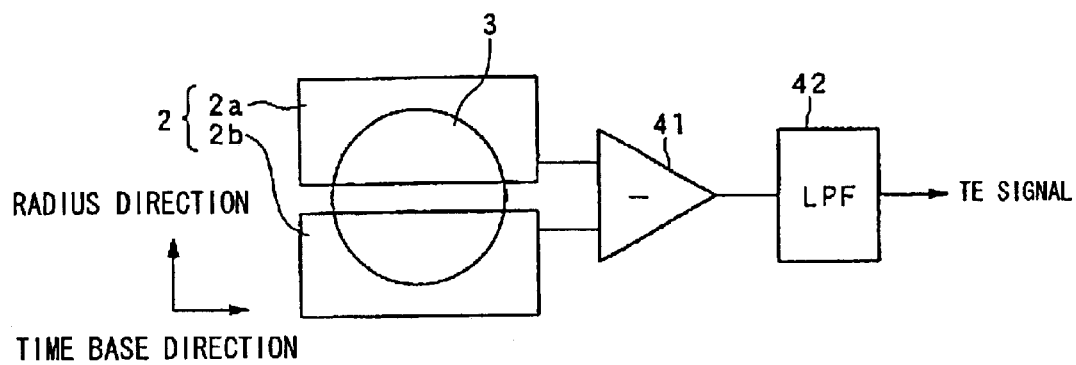
FIG. 6 is a view illustrating a circuit for detecting a tracking error through the push-pull system for comparison purposes.
Figure 7:
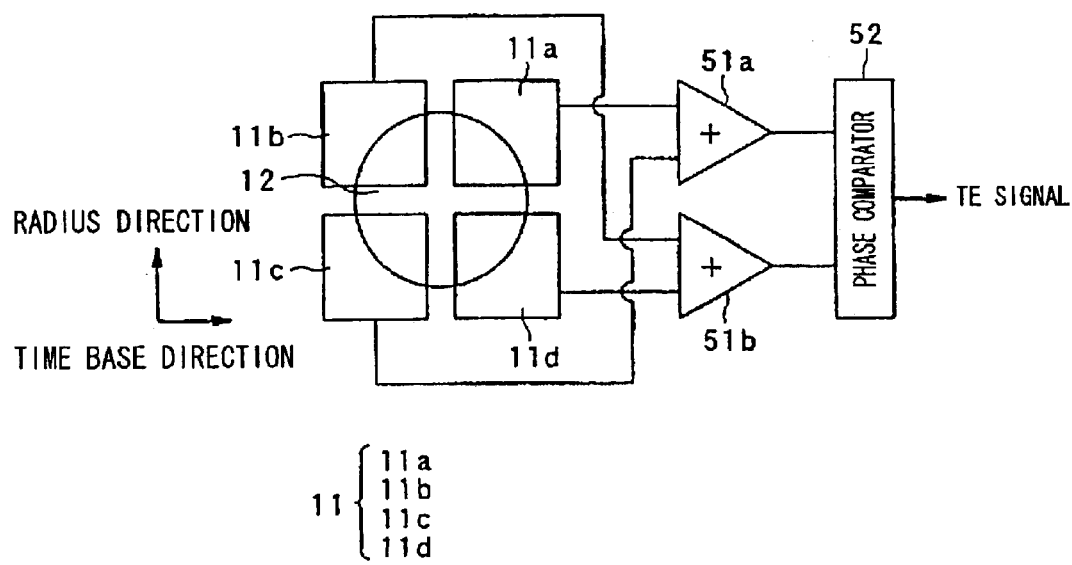
FIG. 7 is a view illustrating a circuit for detecting a tracking error through the phase difference system for comparison purposes.

Now, description will be given below for the comparison purpose of the push-pull system and the phase difference system, which have conventionally been applied, with reference to FIGS. 6 and 7. FIG. 6 is a view illustrating a circuit for detecting a tracking error through the push-pull system and FIG. 7 is a view illustrating a circuit for detecting a tracking error through the phase difference system.

The push-pull system is composed of a two-divided type detector 2, a differential device 41 and a LPF (low pass filter) 42, as shown in FIG. 6. The two-divided type detector 2 is provided with two photo detecting elements 2a, 2b, which are disposed separately form each other in the direction corresponding to the radius direction of an optical disc. The differential device 41 obtains a difference between the outputs from the two photo detecting elements 2a, 2b. The LPF 42 removes the high frequency components from the output of the differential device 41. The photo detecting elements 2a, 2b detect light reflected from the optical disc in a beam spot 3. Deviation of the beam spot 3 from the track leads to intensity distribution of the reflected light, which is asymmetrical relative to the radius direction. Consequently, the difference serving as the tracking error signal is outputted from the differential device 41. In such a system, the signal level depends on an amount of light reflected from the optical disc. Such a push-pull system is not suitable for application for example to a multi-layer optical disc having a small amount of reflected light.

On the contrary, in the tracking error detecting system 1 according to the present invention, the two-divided type detector 2 can be utilized without making any change or modification and the sufficient signal can be obtained even when the optical disc has the multi-layer structure.

The phase difference system is composed of a four-divided type detector 11, first and second adders 51a and 51b and a phase comparator 52. The four-divided type detector 11 is provided with four photo detecting elements 11a to 11d, which are disposed separately from each other in the direction corresponding to the radius direction of the optical disc and in the time base direction. The first adder 51a adds the output from the photo detecting element 11a to the output from the photo detecting element 11c to output the first added signal. The second adder 51b adds the output from the photo detecting element 11b and the output from the photo detecting element 11d to output the second added signal. The phase comparator 52 makes comparison in phase between the first and second added signals outputted from the first and second adders 51a and 51b, respectively. The photo detecting elements 11a to 11d detect light reflected from pits of an optical disc in a beam spot 3. Such a phase difference system utilized the reproduction signals, thus making it impossible to obtain any signal of tracking error for an optical disc with a groove, which has not as yet been subjected to a recording step.

On the contrary, in the tracking error detecting system 10 according to the present invention, the four-divided type detector 11 can be utilized without making any change or modification and it is possible to obtain the tracking error signal from an optical disc with a groove, which has not as yet been subjected to a recording step.

The measures to detect the tracking error include a DPP (Differential Push-Pull) system, which copes with an optical axis deviation of a light beam due to deviation of an optical disc, in addition to the push-pull system and the phase difference system as described above. The DPP system utilizes three light beams including a main beam and two sub-beams so that tracking error signals obtained from the respective photo detecting elements are applicable to the tracking servo, while both of the push-pull system and the phase difference system utilize the single light beam. The present invention may be combined with the above-mentioned DPP system so that the signals of the three light beams are subjected to the similar processing to the first embodiment of the present invention to provide a tracking error signal.

[Information Recording and Reproducing Apparatus]

Now, description will be given below of an information recording and reproducing apparatus 20 to which the above-described tracking error detecting system 1, 10 is applied to record information on an optical disc or reproduce the information recorded thereon. The information recording and reproducing apparatus 20 is provided, as shown in FIG. 8, with a mechanical group including a spindle motor 21, an optical pickup 22 and a slider 23; a signal processing group including an RF signal processing unit 24, a demodulating unit 25, a modulating unit 33 and a laser driving unit 34; a servo group including a tracking servo unit 27, a tracking error detecting unit 27a, a focus servo unit 28, a focus error detecting unit 28a, a slider servo unit 29, a positional error detecting unit 29a, a spindle servo unit 30 and a revolution number error detecting unit 30a; and an interface group including an output unit 31, an input unit 32, an operation input unit 36 and a display unit 37. In addition, there is provided a control unit 35 for controlling the above-mentioned components.

The spindle motor 21 rotates an optical disc 9 as set at a predetermined rotational speed, i.e., at a predetermined number of rotations or with a predetermined linear velocity. The revolution control of the spindle motor 21 is made as follows. The spindle servo unit 30 generates a control signal based on a signal as reproduced and a revolution number error signal, which has been detected by the revolution number error detecting unit 30a on the basis of a frequency signal corresponding to the number of revolutions of the spindle motor 21. The control signal thus generated is input to the spindle motor 21 to control the number of rotations thereof.

The optical pickup 22 is a device to read information from the optical disc 9 or write information thereon. The single optical pickup, which is commonly applicable to the reading and writing, is provided. Alternatively, a read-only optical pickup and a write-only optical pickup may be provided independently. The light detecting device is configured as the two-divided type detector 2 in case of the push-pull system, the four-divided type detector 11 in case of the phase difference system and the combination of the two-divided type detector 2 for the main beam and two detectors for the sub-beams in case of the DPP system.

There is a need to make a positional control of the beam spot of the laser beam in the focusing direction and the tracking direction so as to focus the laser beam on the pit of the optical disc 9 and detect the reflected light to read information. More specifically, the tracking error detecting unit 27a and the focus error detecting unit 28a respectively detect errors in the tracking and focusing from the signals, which have been detected from the optical pickup 22. The tracking servo 27 and the focus servo 28 generate the respective control signals based on the errors thus detected. The thus generated control signals are inputted to the optical pickup 22 to make a control thereof. The tracking control may be made by conducting the positional control in the radius direction of the optical disc by means of the slider 23.

The above-described tracking error detecting system of the present invention is applied to the tracking error detecting unit 27a. Accordingly, the information recording and reproducing apparatus 20 is applicable to not only the optical disc 9 such as repdocution-only type, a recordable type or a rewritable type but also the optical disc 9 having the single layer structure or the multi-layer structure.

The slider 23 is a transferring mechanism for moving rapidly the optical pickup 22 to a target position in the radius direction of the optical disc 9. With respect to such a slider, there is available a mechanism in which a carriage on which the optical pickup 22 is mounted is carried through a screw shaft. The controlled movement of the optical pickup 22 by the slider 23 includes not only the rapid movement of the optical pickup 22 to the target position, but also the slow movement of the optical pickup 22 from the inner side toward the outer side along with the progress of the optical disc 9. More specifically, the positional error detecting unit 29a detects a positional error on the basis of the positional information of the optical pickup 22, which is outputted from the slider 23, and the accumulated errors (i.e., the direct-current component of the tracking error) of the tracking error, which is obtained from the reproduced signal. The slider servo unit 29 generates a control signal based on the thus detected positional error. The control signal thus generated is inputted to the slider 23 to make a control thereof.

The RF signal processing unit 24 converts the RF signal outputted from the optical pickup 22 into a signal suitable for the subsequent signal processing.

The demodulating unit 25, which is to apply a reconstruction process to the signal processed by the RF signal processing unit 24, reconstructs the original information on the basis of a modulated format. The demodulating unit 25 has also an error correction function and the reconstructed signal is outputted from the demodulating unit through the output unit 31 to a loudspeaker in case of audio information, a monitor in case of visual information and a personal computer or the like in case of data information.

The modulating unit 33 converts the signal, which is inputted in the form of recording signal in the input unit, into a predetermined format to generate the recording signal. A signal processing for error correction is also carried out. The signal, which is modulated into the recording signal, is inputted to the laser driving unit 34 to modulate the laser of the optical pickup 22 so that the laser is radiated to the optical disc to record information.

The control unit 35, which is provided with a CPU, controls the whole information recording and reproducing apparatus 20 and causes the display unit 37 to display the operation conditions, on the basis of the information from the respective components and an operational instruction from the operation input unit 36. The operation input unit 36 may be configured utilizing a predetermined mechanical input device or a remote control unit. The display unit 37 is configured utilizing a CRT, a liquid crystal display device or an EL display device.

The structure of the information recording and reproducing apparatus is described above. Excluding the input unit 32, the modulating unit 33 and the laser driving unit 34 from the information recording and reproducing apparatus provides an information reproducing apparatus and excluding the RF signal processing unit 24, the demodulating unit 25 and the output unit 31 therefrom provides an information recording apparatus. The present invention may be applied any one of these apparatus, thus performing the high accuracy tracking.

The present invention is not limited only to the above-described embodiments, but may be modified appropriately in a scope of the subject matter or inventive concept of the present invention, which are readable from the entire claims and the specification. The technical concept of the present invention therefore includes such modifications of the system and method for detecting the tracking error.

According to the system and method of the present invention as described in detail for detecting the tracking error, it is possible to make a detection of tracking error signals with high quality for various kinds of optical discs such as a reproduction-only type, a recordable type, a rewritable type, a single-layer type and a multiple-layer type, so as to be applicable to the positional control of the beam spot by the optical pickup. As a result, the single kind of tracking error detecting device suffices, irrespective of the mode of recording or reproducing. In addition, utilizing the two-divided type detector as the light detecting device provides the simple and inexpensive structure.

The entire disclosure of Japanese Patent Application No. 2002-127877 filed on Apr. 30, 2002 including the specification, claims, drawings and summary is incorporated herein by reference in its entirety.

What is claimed is:

1. A system for detecting a tracking error, which is to be applied to a tracking servo for causing a light beam to follow a track of an optical disc, said system comprising:
    a light detecting device for detecting light reflected from said optical disc, said light detecting device comprising two photo detecting elements, which are disposed separately from each other in a direction corresponding to a radius direction of the optical disc;
    two oscillating devices for generating sine waves, said sine waves having amplitudes based on output levels of said two photo detecting elements, respectively, said sine waves having an identical frequency to each other and being synchronized with each other;
    a first delay device for adding a predetermined amount of delay to the sine wave, which is generated by one of said two oscillating devices, to delay said sine wave;
    a second delay device for adding a same amount of delay as said predetermined amount of delay to the sine wave, which is generated by another of said two oscillating devices, to delay said sine wave;
    a first adding device for adding a signal of the sine wave generated by said one of said two oscillating devices to a signal of the sine wave as delayed by said first delay device, to output a first added signal;
    a second adding device for adding the signal of the sine wave generated by said one of said two oscillating devices to a signal of the sine wave as delayed by said second delay device, to output a second added signal; and
    a phase comparison device for comparing said first added signal with said second added signal to make a comparison in phase between sine waves based on said first and second added signals, so as to provide a comparison result, and generating and outputting a tracking error signal based on said comparison result.

2. The system as claimed in claim 1, further comprising:
    a low-pass filter for enabling only a low frequency component of an output from said two photo detecting elements to pass.

3. The system as claimed in claim 1, further comprising:
    a generated frequency setting device for setting a generated frequency for each of said two oscillating devices.

4. The system as claimed in claim 1, further comprising:
    a delay amount setting device for setting an amount of delay for each of said first delay device and said second delay device.

5. A system for detecting a tracking error, which is to be applied to a tracking servo for causing a light beam to follow a track of an optical disc, said system comprising:
    a light detecting device for detecting light reflected from said optical disc, said light detecting device comprising four photo detecting elements, which are disposed separately from each other in a direction corresponding to a radius direction of the optical disc and in a direction corresponding to a tangential line to said track;
    four oscillating devices for generating sine waves, said sine waves having amplitudes based on output levels of said four photo detecting elements, respectively, said sine waves having an identical frequency to each other and being synchronized with each other, said four oscillating devices comprising two outer oscillating devices and two inner oscillating devices relative to said track;
    a first delay device for adding a predetermined amount of delay to the sine wave, which is generated by one of said two outer oscillating devices, to delay said sine wave;
    a second delay device for adding a same amount of delay as said predetermined amount of delay to the sine wave, which is generated by one of said two inner oscillating devices, to delay said sine wave;
    a first adding device for adding a signal of the sine wave generated by another of said two outer oscillating devices to a signal of the sine wave as delayed by said second delay device, to output a first added signal;
    a second adding device for adding the signal of the sine wave generated by another of said two inner oscillating devices to a signal of the sine wave as delayed by said first delay device, to output a second added signal; and
    a phase comparison device for comparing said first added signal with said second added signal to make a comparison in phase between sine waves based on said first and second added signals, so as to provide a comparison result, and generating and outputting a tracking error signal based on said comparison result.

6. The system as claimed in claim 5, further comprising:
a low-pass filter for enabling only a low frequency component of an output from said four photo detecting elements to pass.

7. The system as claimed in claim 5, further comprising:
a generated frequency setting device for setting a generated frequency for each of said four oscillating devices.

8. The system as claimed in claim 5, further comprising:
a delay amount setting device for setting an amount of delay for each of said first delay device and said second delay device.

9. A method for detecting a tracking error, which is to be applied to a tracking servo for causing a light beam to follow a track of an optical disc, said method comprising:

a light detection step for detecting light reflected from said optical disc, utilizing two photo detecting elements, which are disposed separately from each other in a direction corresponding to a radius direction of the optical disc;

two oscillation steps for generating sine waves having amplitudes based on output levels of said two photo detecting elements, respectively, said sine waves having an identical frequency to each other and being synchronized with each other;

a first delay step for adding a predetermined amount of delay to the sine wave, which is generated by one of said two oscillation steps, to delay said sine wave;

a second delay step for adding a same amount of delay as said predetermined amount of delay to the sine wave, which is generated by another of said two oscillation steps, to delay said sine wave;

a first addition step for adding a signal of the sine wave generated by said one of said two oscillation steps to a signal of the sine wave as delayed by said first delay device, to output a first added signal;

a second addition step for adding the signal of the sine wave generated by said one of said two oscillation steps to a signal of the sine wave as delayed by said second delay device, to output a second added signal; and a phase comparison step for comparing said first added signal with said second added signal to make a comparison in phase between sine waves based on said first and second added signals, so as to provide a comparison result, and generating and outputting a tracking error signal based on said comparison result.

10. A method for detecting a tracking error, which is to be applied to a tracking servo for causing a light beam to follow a track of an optical disc, said method comprising:

a light detecting step for detecting light reflected from said optical disc, utilizing four photo detecting elements, which are disposed separately from each other in a direction corresponding to a radius direction of the optical disc and in a direction corresponding to a tangential line to said track;

four oscillating steps for generating sine waves having amplitudes based on output levels of said four photo detecting elements, respectively, said sine waves having an identical frequency to each other and being synchronized with each other, said four oscillating steps comprising two outer oscillating steps carried out on an outer side relative to said track and two inner oscillating steps carried out on an inner side relative thereto;

a first delay step for adding a predetermined amount of delay to the sine wave, which is generated by one of said two outer oscillating steps, to delay said sine wave;

a second delay step for adding a same amount of delay as said predetermined amount of delay to the sine wave, which is generated by one of said two inner oscillating steps, to delay said sine wave;

a first adding step for adding a signal of the sine wave generated by another of said two outer oscillating steps to a signal of the sine wave as delayed by said second delay step, to output a first added signal;

a second adding step for adding the signal of the sine wave generated by another of said two inner oscillating steps to a signal of the sine wave as delayed by said first delay step, to output a second added signal; and a phase comparison step for comparing said first added signal with said second added signal to make a comparison in phase between sine waves based on said first and second added signals, so as to provide a comparison result, and generating and outputting a tracking error signal based on said comparison result.

* * * * *